United States Patent
Yao (10) Patent No.: US 9,581,133 B2
(45) Date of Patent: Feb. 28, 2017

(54) WIND TURBINE BLADE WITH NOISE REDUCTION DEVICES AND RELATED METHOD

(75) Inventor: Qingshan Yao, Skodsborg (DK)

(73) Assignee: LM WINDPOWER A/S, Kolding (DK)

(*) Notice: Subject to any disclaimer, the term of this patent is extended or adjusted under 35 U.S.C. 154(b) by 632 days.

(21) Appl. No.: 14/118,094

(22) PCT Filed: May 14, 2012

(86) PCT No.: PCT/EP2012/058906
§ 371 (c)(1),
(2), (4) Date: Mar. 6, 2014

(87) PCT Pub. No.: WO2012/156359
PCT Pub. Date: Nov. 22, 2012

(65) Prior Publication Data
US 2014/0227101 A1    Aug. 14, 2014

(30) Foreign Application Priority Data
May 16, 2011    (EP) .................. 11166249

(51) Int. Cl.
*F03D 1/06*    (2006.01)
*F03D 1/00*    (2006.01)

(52) U.S. Cl.
CPC .......... *F03D 1/0641* (2013.01); *F03D 1/001* (2013.01); *F03D 1/065* (2013.01); *F03D 1/0608* (2013.01);
(Continued)

(58) Field of Classification Search
CPC ........ F03D 1/0608; F03D 1/065; F03D 1/001; F03D 1/0641; F05B 2240/301;
(Continued)

(56) References Cited

U.S. PATENT DOCUMENTS 5,088,665 A * 2/1992 Vijgen .................. B64C 23/06
244/198
5,533,865 A * 7/1996 Dassen ................ F03D 1/0608
244/200

(Continued)

FOREIGN PATENT DOCUMENTS

DE    10 2008 002 930 A1    1/2009
EP        0 652 367 A1    5/1995
(Continued)

*Primary Examiner* — Matthew W Jellett
(74) *Attorney, Agent, or Firm* — Nath, Goldberg & Meyer; Jerald L. Meyer; Tanya E. Harkins (57) ABSTRACT

The present disclosure relates to a wind turbine blade, in particular a wind turbine blade having devices or structures for reducing noise generated by the wind turbine blade during use and related method. The wind turbine blade comprises at least a first longitudinal section having a cross section perpendicularly to a longitudinal direction, the cross section having a plurality of flow modulating devices including a first primary flow modulating device and a secondary flow modulating device for modulating noise spectra, wherein the first primary flow modulating device and the first secondary flow modulating device are spaced perpendicularly to the longitudinal direction. Also disclosed is a method of retrofitting a wind turbine blade.

15 Claims, 7 Drawing Sheets

(52) U.S. Cl.
CPC ..... *F05B 2240/301* (2013.01); *F05B 2260/96* (2013.01); *Y02E 10/721* (2013.01); *Y10T 29/49337* (2015.01)

(58) Field of Classification Search
CPC ........... F05B 2260/96; Y10T 29/49337; Y02E 10/721; F04D 29/023; F04D 29/289; F04D 29/324; F04D 29/663; F04D 29/664; F04D 29/668; F02C 7/045
USPC ............. 415/119; 416/228, 236 R, 237, 240, 416/223 R–223 B
See application file for complete search history.

(56) References Cited

U.S. PATENT DOCUMENTS

| | | | | |
|---|---|---|---|---|
| 6,830,436 | B2* | 12/2004 | Shibata | F03D 1/0641 416/228 |
| 7,059,833 | B2* | 6/2006 | Stiesdal | F03D 1/0641 29/889.3 |
| 7,909,576 | B1 | 3/2011 | van der Bos et al. | |
| 7,976,276 | B2* | 7/2011 | Riddell | F03D 1/0633 416/223 R |
| 7,976,283 | B2* | 7/2011 | Huck | F03D 1/0633 415/119 |
| 8,083,488 | B2* | 12/2011 | Fritz | F03D 1/0675 416/224 |
| 8,414,261 | B2* | 4/2013 | Bonnet | F03D 1/0641 415/119 |
| 8,506,250 | B2* | 8/2013 | Bagepalli | F03D 1/0675 29/889.71 |
| 8,794,927 | B2* | 8/2014 | Vassilicos | F15D 1/10 416/228 |
| 2008/0187442 | A1* | 8/2008 | Standish | F03D 1/001 416/235 |
| 2009/0074585 | A1 | 3/2009 | Koegler et al. | |
| 2009/0123289 | A1 | 5/2009 | Tangler et al. | |

FOREIGN PATENT DOCUMENTS

| | | |
|---|---|---|
| EP | 1112 928 A2 | 7/2001 |
| EP | 2 253 839 A1 | 11/2010 |
| EP | 2 320 076 A2 | 5/2011 |
| WO | 2007/114698 A2 | 10/2007 |

* cited by examiner

WIND TURBINE BLADE WITH NOISE REDUCTION DEVICES AND RELATED METHOD

This is a National Phase Application filed under 35 U.S.C. 371 as a national stage of PCT/EP2012/058906, filed May 14, 2012, claiming priority from European Application No. 11166249.0, filed May 16, 2011, the content of each of which is hereby incorporated by reference in its entirety.

FIELD OF THE INVENTION

The present invention relates to a wind turbine blade, in particular a wind turbine blade having devices or structures for reducing noise generated by the wind turbine blade during use.

BACKGROUND OF THE INVENTION

The ever growing number of wind turbines implies an increased demand for suitable wind turbine locations. Wind turbine blades of a wind turbine create a considerable quantity of noise during operation. In general, noise from wind turbines is a limiting factor when considering possible wind turbine locations.

It is known to provide a serrated panel at the trailing edge of a wind turbine blade, with a view to reducing the operational noise of a wind turbine blade, e.g. U.S. Pat. No. 7,909,576. However, such a system does not provide a complete elimination of trailing edge noise, nor does it account the noise generated by wind turbine blades of increased dimensions and/or having blunt trailing edge profiles.

Accordingly, it is an object of the present invention to provide a wind turbine blade with improved noise properties, i.e. it is desired to provide a low-noise wind turbine blade in order to minimize noise from wind turbines thereby reducing noise nuisance for people living near wind turbines. Further a low-noise wind turbine blade or a wind turbine blade with tailored noise properties may enable wind turbine locations near or in populated areas. Further, it may be an object to provide a low noise wind turbine blade with a minimum reduction of performance or even improved aerodynamic properties.

SUMMARY OF THE INVENTION

Accordingly, there is provided a wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the wind turbine blade further comprising at least a first longitudinal section having a cross section with a first plurality of projecting elements provided at the trailing edge on said pressure side and a second plurality of projecting elements provided at the trailing edge on said suction side, said first plurality spaced from said second plurality in a flapwise direction, wherein said first plurality of projecting elements are arranged to perform a first modulation operation of a boundary layer flow of the pressure side of the blade, wherein said second plurality of projecting elements are arranged to perform a second modulation operation of a boundary layer flow of the suction side of the blade, said first and second modulation operations operable to reduce the operational noise of the wind turbine blade, and wherein said first plurality of projecting elements and said second plurality of projecting elements are arranged such that said first modulation operation is different to said second modulation operation.

As the blade comprises two different arrangements of projecting elements shaped to perform different modulation operations on the suction side and pressure side flows, the blade may be configured to perform an improved and more effective reduction of the blade operational noise, by tailoring the modulation performed on the pressure side to reduce noise generated by the pressure side flow, and tailoring the modulation performed on the suction side to reduce noise generated by the suction side flow. Such an efficient and directed reduction of the particular noise generated by the different flows provides an improved reduction of the overall noise generated by the operation of the wind turbine blade.

A flapwise direction is understood as a direction orthogonal to the longitudinal direction of the blade and to the chord of the blade.

Preferably, the shape of said first plurality of projecting elements is different to the shape of said second plurality of projecting elements, such that said first modulation operation is different to said second modulation operation.

Preferably, at least one of said first plurality of projecting elements and said second plurality of projecting elements comprises a base and at least one protruding element and is arranged as a panel, strip or tape extending along the first longitudinal section.

Providing the projecting elements as part of a panel, strip or tap allows for easy retrofitting of the elements to existing blades, Preferably, said first plurality of projecting elements forms a first serrated edge having a first spatial frequency, and said second plurality of projecting elements forms a second serrated edge having a second spatial frequency, wherein said first spatial frequency is different to said second spatial frequency.

As the projecting elements may comprise a serrated panel having a plurality of projecting teeth elements. the distance between adjacent elements may be varied depending on the modulation it is desired to be performed on the boundary layer flow at the trailing edge. It will further be understood that the spatial frequency of the projecting elements may be varied as a function of the longitudinal distance of the projecting elements from the root end of the blade.

Preferably, said first plurality of projecting elements forms a first serrated edge having a first inter-serration vertex angle, and said second plurality of projecting elements forms a second serrated edge having a second inter-serration vertex angle, wherein said first inter-serration vertex angle is different to said second inter-serration vertex angle.

As the serrations have different angles, different modulation effects can be performed at the different sides of the blade trailing edge.

Preferably, said first plurality of projecting elements forms a first serrated edge having a first serration length, and said second plurality of projecting elements forms a second serrated edge having a second serration length, wherein said first serration length is different to said second serration length.

Longer serrations will provide a different flow modulation compared to shorter serrations, resulting in a different effect on the noise generated at the blade trailing edge. The length of the serrations may be selected to provide for the maximum reduction of the trailing edge noise as a result of the pressure side and suction side boundary layer flows.

Preferably, said first plurality of projecting elements forms a first serrated edge, and said second plurality of projecting elements forms a second serrated edge, wherein said first serrated edge is offset in the longitudinal direction from said second serrated edge.

Providing offset serrated edges can result in a greater overall noise reduction at the trailing edge, as the projecting elements of the first plurality may overlap with the inter-serration gaps of the second plurality of projecting elements.

Preferably, said first plurality of projecting elements forms a first serrated edge, and said second plurality of projecting elements forms a second serrated edge, wherein said first serrated edge is offset in the edgewise direction from said second serrated edge.

One of the first and second pluralities of projecting elements may be stepped back relative to the other of the pluralities, to provide a different modulation effect on the respective boundary layer flows.

Preferably, said profiled contour comprises a blunt trailing edge, and wherein said first plurality of projecting elements are provided on the pressure side of said blunt trailing edge, and wherein said second plurality of projecting elements are provided on the suction side of said blunt trailing edge.

Preferably, at least one of said first plurality of projecting elements and said second plurality of projecting elements are arranged within an interval of 70-100% of the chord length from the leading edge of the blade in the edgewise direction.

Preferably, at least one of said first plurality of projecting elements and said second plurality of projecting elements are formed from a relatively flexible material, said at least one first or second plurality operable to flex with the passage of wind over said at least one first or second plurality.

The flexible material may comprise may comprise any suitable plastics material, a synthetic or natural rubber material, or a flexible composite material.

Additionally or alternatively, at least one of said first plurality of projecting elements and said second plurality of projecting elements are formed from a relatively stiff material, said at least one first or second plurality operable to resist flexing with the passage of wind over said at least one first or second plurality.

The stiff material may comprise any suitable metal material, a hardened plastics material, a reinforced composite material.

In one embodiment, a first of said first plurality of projecting elements and said second plurality of projecting elements are formed from a relatively stiff material, and a second of said first plurality of projecting elements and said second plurality of projecting elements are formed from a relatively flexible material.

Providing such a difference in the relative flexibility of the projecting elements will act to provide a different modulation effect on the respective boundary layer flows over the projecting elements.

Preferably, the first longitudinal section at least partly extends in the longitudinal direction at a distance from the root end in the range from 0.3L to L, where L is the length of the wind turbine blade.

There is further provided a wind turbine having at least one wind turbine blade as described above.

There is also provided a method of retrofitting a wind turbine blade extending in a longitudinal direction and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the method comprising:

mounting a flow modulating system on the wind turbine blade, such that the wind turbine blade comprises at least one longitudinal section having a cross section and a plurality of flow modulating devices, wherein the at least one longitudinal section comprises a first longitudinal section having a cross section with a first plurality of projecting elements provided at the trailing edge on said pressure side and a second plurality of projecting elements provided at the trailing edge on said suction side, said first plurality spaced from said second plurality in a flapwise direction, wherein said first plurality of projecting elements are arranged to perform a first modulation operation of a boundary layer flow of the pressure side of the blade, wherein said second plurality of projecting elements are arranged to perform a second modulation operation of a boundary layer flow of the suction side of the blade, and wherein the shape of said first plurality of projecting elements is different to the shape of said second plurality of projecting elements, such that said first modulation operation is different to said second modulation operation.

The use of such a retrofitting method allows for existing blades to be fitted with flow modulation elements which are specifically tailored to the boundary layer flows over the blade, providing for an improved and effective reduction in the operational noise of the blade.

Preferably, the flow modulating system comprises at least one flow modulating device having a base and at least one protruding element, and wherein mounting at least one flow modulating device on the wind turbine blade comprises attaching the base at the trailing edge of the wind turbine blade.

There is also described a wind turbine blade for a rotor of a wind turbine having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, is provided. The wind turbine blade comprises a profiled contour including a pressure side and a suction side, as well as a leading edge and a trailing edge with a chord having a chord length extending there between, the profiled contour, when being impacted by an incident airflow, generating a lift, wherein the wind turbine blade comprises at least a first longitudinal section having a cross section with a plurality of flow modulating devices. The plurality of flow modulating devices includes a first primary flow modulating device and a secondary flow modulating device for modulating noise spectra, and the first primary flow modulating device and the first secondary flow modulating device are spaced perpendicularly to the longitudinal direction.

Further disclosed is a method of retrofitting a wind turbine blade, the wind turbine blade extending in a longitudinal direction and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift. The method comprises mounting a flow modulating system on the wind turbine blade, such that the wind turbine blade comprises at least one longitudinal section having a cross section and a plurality of flow modulating devices, wherein the at least one longitudinal section comprises a first longitudinal section having a cross section with a first primary flow modulating device and a first secondary flow modulating device for modulating the boundary layer noise, wherein the first primary flow modulating device and the first secondary flow modulating device are spaced perpendicular to the longitudinal direction.

The wind turbine blade according to the present invention exhibits improved and/or tailored noise properties thereby enabling a wind turbine operator to operate a wind turbine at sites where low noise is desired or required.

BRIEF DESCRIPTION OF THE DRAWINGS

The above and other features and advantages of the present invention will become readily apparent to those skilled in the art by the following detailed description of exemplary embodiments thereof with reference to the attached drawings, in which.

DETAILED DESCRIPTION

The figures are schematic and simplified for clarity, and they merely show details which are essential to the understanding of the invention, while other details have been left out. Throughout, the same reference numerals are used for identical or corresponding parts.

The wind turbine blade comprises one or more longitudinal sections including a first longitudinal section having a cross section with a first and a second flow modulating device. The first flow modulating device and the second flow modulating device are spaced perpendicularly to the longitudinal direction of the wind turbine blade. Provision of a first and second flow modulating device enables modulation of at least two separate flows or at least two different frequency spectra of the boundary layer noise. Thereby a wind turbine blade with improved noise properties may be provided.

The first flow modulating device may be arranged to modulate a boundary layer flow of the pressure side of the blade. The second flow modulating device may be arranged to modulate a boundary layer flow of the suction side of the blade.

Modulating the boundary layer flow of the suction side and the pressure side, respectively, e.g. near the trailing edge of the wind turbine blade enables a more efficient mitigation, frequency shift or elimination of noise generated by operating the wind turbine. Using a plurality of flow modulating devices enables creation of a mixing zone or space where modulated pressure side flow and modulated suction side flow is mixed. Provision of a plurality of flow modulating devices facilitates a wind turbine blade design with controlled or modulated mixing of pressure and suction side boundary flows resulting in improved noise properties of the wind turbine blade.

A flow modulating device, e.g. the first primary flow modulating device and/or the first secondary flow modulating device, may comprise a base and at least one protruding element extending from the base. Two, three, or more flow modulating devices may share a common base. A flow modulating device may be arranged as a panel, strip or tape extending along the first longitudinal section. A flow modulating device may have a suitable length, i.e. extension in the longitudinal direction. Flow modulating devices may have lengths in the range from about 0.2 m to about 50 m, such as in the range from about 1 m to about 10 m. Lengths about 2 m may be advantageous, e.g. when retrofitting a flow modulating device arranged as a panel on a wind turbine blade. The base of a flow modulating device may comprise fastening elements enabling mechanical fastening of a flow modulating device to the shell body. Additionally or as an alternative, the base or parts thereof may be provided with an adhesive layer enabling adhesion of the flow modulating device to the shell body of the wind turbine blade. Arranging the flow modulating devices on a panel, strip or tape may advantageously facilitates manufacture and enables retrofitting flow modulating devices on existing blades.

Protruding elements extending from the base of a flow modulating device may have any suitable shape and size in order to obtain a desired modulation of the boundary layer flows. A protruding element may be formed as a serration, e.g. a plane serration, with a first surface and a second surface and having one or more edge parts, e.g. including a first edge part and a second edge part. The edge parts may be straight or curved. The first surface and/or the second surface may be plane and/or curved surfaces. A protruding element may have a thickness in the range from 0.5 mm to about 20 mm, such as about 1 mm to about 10 mm. In one or more embodiments, the thickness of one or more protruding elements of a flow modulating device is about 2 mm. The edge parts may be rounded. A protruding element may have a length in the range from about 3 cm to about 20 cm such as in the range from 5 cm to about 15 cm. In one or more embodiment, one or more protruding elements may have a length larger than 6 cm.

The first primary flow modulating device may form a first serrated edge, e.g. a first serrated trailing edge, of the wind turbine blade and may have a first spatial frequency. Accordingly, the first primary flow modulating device may be mounted or arranged near or at the trailing edge of the wind turbine blade.

The first secondary flow modulating device may form a second serrated edge, e.g. a second serrated trailing edge, of the wind turbine blade and may have a second spatial frequency. Accordingly, the first secondary flow modulating device may be mounted or arranged near or at the trailing edge of the wind turbine blade.

In general, flow modulating devices, such as the first primary and/the first secondary flow modulating device, may be arranged within an interval of 70-100% of the chord length from the leading edge of the blade in the edgewise direction, i.e. along a first axis parallel to the chord. Thereby, the largest noise reducing effect with minimum disturbance of blade effect may be provided, since noise is mainly generated at the trailing edge of the wind turbine blade.

The first primary and the first secondary flow modulating devices may be spaced in an edgewise direction of the wind turbine blade.

The first primary and the first secondary flow modulating devices may be spaced in a flapwise direction perpendicular to the edgewise direction of the wind turbine blade.

The first primary and the first secondary flow modulating devices may be arranged on different sides of the wind turbine blade, i.e. the first primary flow modulating device may be arranged on the pressure side of the wind turbine blade and the first secondary flow modulating device may be arranged on the suction side of the wind turbine blade. Arranging flow modulating devices on different sides of the wind turbine blade facilitates separate modulation of the pressure and suction side flows.

In one or more embodiments, the first primary and the first secondary flow modulating devices are arranged on the same side of the wind turbine blade.

One or more flow modulating devices, such as the first primary flow modulating device, may be flexible, thus being configured to alleviate load fluctuations/pressure difference fluctuations on the wind turbine blade.

The first secondary flow modulating device may be stiff. The load fluctuations in the suction side flow may be less than the load fluctuations in the pressure side flow. Accordingly, a stiff first secondary flow modulating device may be selected considering costs and life time of the flow modulating device.

A flow modulating device of a longitudinal section may be characterized by the angle between the chord and the flow modulating device. A flow modulating device or protruding elements thereof may be substantially parallel to the chord or form an angle with the chord. A primary flow modulating device may form a primary angle α with the chord and a secondary flow modulating device may form a secondary angle β with the chord. In one or more embodiments, the primary angle α is in the range from 0° to about 60°, such as in the range from 0° to about 45°. In one or more embodiments the primary angle α is in the range from 0° to about 30°. In one or more embodiments, the secondary angle β is in the range from 0° to about 60°, such as in the range from 0° to about 45°. In one or more embodiments, the secondary angle β is in the range from 0° to about 30°.

A primary flow modulating device or primary protruding elements thereof may form an angle θ with the secondary flow modulating device or secondary protruding elements thereof. The angle θ between the primary flow modulating device and the secondary flow modulating device may be in the range from 0° to about 45°. A relatively small angle, e.g. where the angle θ is in the range from 0° to about 20° may be preferred.

The primary angle of a primary flow modulating device may vary in the longitudinal direction. For example, different protruding elements of a primary flow modulating device may form different primary angles. The secondary angle of a secondary flow modulating device may vary in the longitudinal direction. For example, different protruding elements of a secondary flow modulating device may form different secondary angles.

A primary protruding element of a primary flow modulating device facing a secondary protruding element of a secondary flow modulating device in a cross section may be substantially parallel to the secondary protruding element, i.e. θ=0. The distance may be in the range from about 0.5 mm to about 5 cm, such as in the range from 1 mm to about 1 cm, e.g. about 2.5 mm.

By having a distance between primary protruding elements and secondary protruding elements, a space or mixing zone is created where modulated boundary flows are mixed facilitating tailored or improved noise properties.

The first longitudinal section of the wind turbine blade may at least partly extend in the longitudinal direction at a distance from the root end in the range from 0.3L to L, where L is the length of the wind turbine blade. In one or more embodiments, the first longitudinal section of the wind turbine blade extends in the longitudinal direction at a distance from the root end in the range from 0.6L to L. It may be beneficial to arrange one or more longitudinal sections with flow modulating devices towards the tip end of the wind turbine blade since noise is mainly created in regions where the flow speeds are high.

The wind turbine blade comprises a profiled contour which may be divided into a root region having a substantially circular or elliptical profile closest to the hub, an airfoil region having a lift-generating profile furthest away from the hub, and optionally a transition region between the root region and the airfoil region. If present, the transition region has a profile gradually changing in the radial or longitudinal direction from the circular or elliptical profile of the root region to the lift-generating profile of the airfoil region. One or more longitudinal sections, e.g. the first longitudinal section and optionally a second longitudinal section may extend in the airfoil region. One or more longitudinal sections may extend in the transition region.

The wind turbine blade may have a length larger than 55 m.

A flow modulating device may constitute or comprise a noise modulating device and/or a noise reducing device.

The method of retrofitting a wind turbine blade enables wind turbine operators and/or manufacturers to upgrade existing wind turbines in order to improve, i.e. reduce or tailor, the noise created by wind turbine blades during operation of the wind turbines or even improve the aerodynamical properties to the wind turbine blade.

The method may comprise mounting at least one flow modulating device comprising a base and at least one protruding element by attaching the base at the trailing edge of the wind turbine blade.

Figure 1:
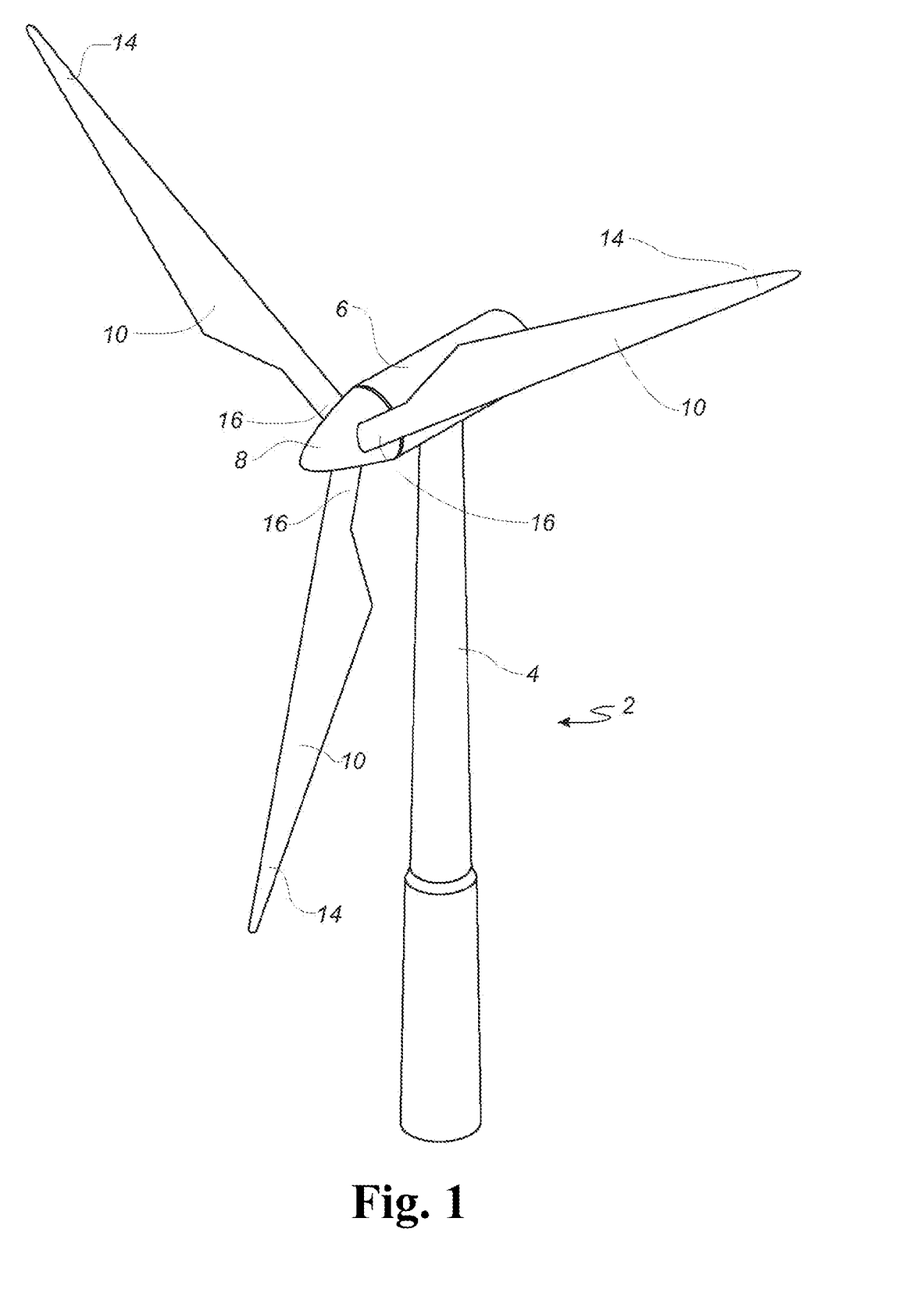
FIG. 1 schematically illustrates a wind turbine.

FIG. 1 illustrates a conventional modern upwind wind turbine 2 according to the so-called "Danish concept" with a tower 4, a nacelle 6 and a rotor with a substantially horizontal rotor shaft. The rotor comprises a hub 8 and three blades 10 extending radially from the hub 8, each blade 10 having a blade root 16 nearest the hub and a blade tip 14 furthest from the hub 8. The rotor has a radius denoted R.

Figure 2:
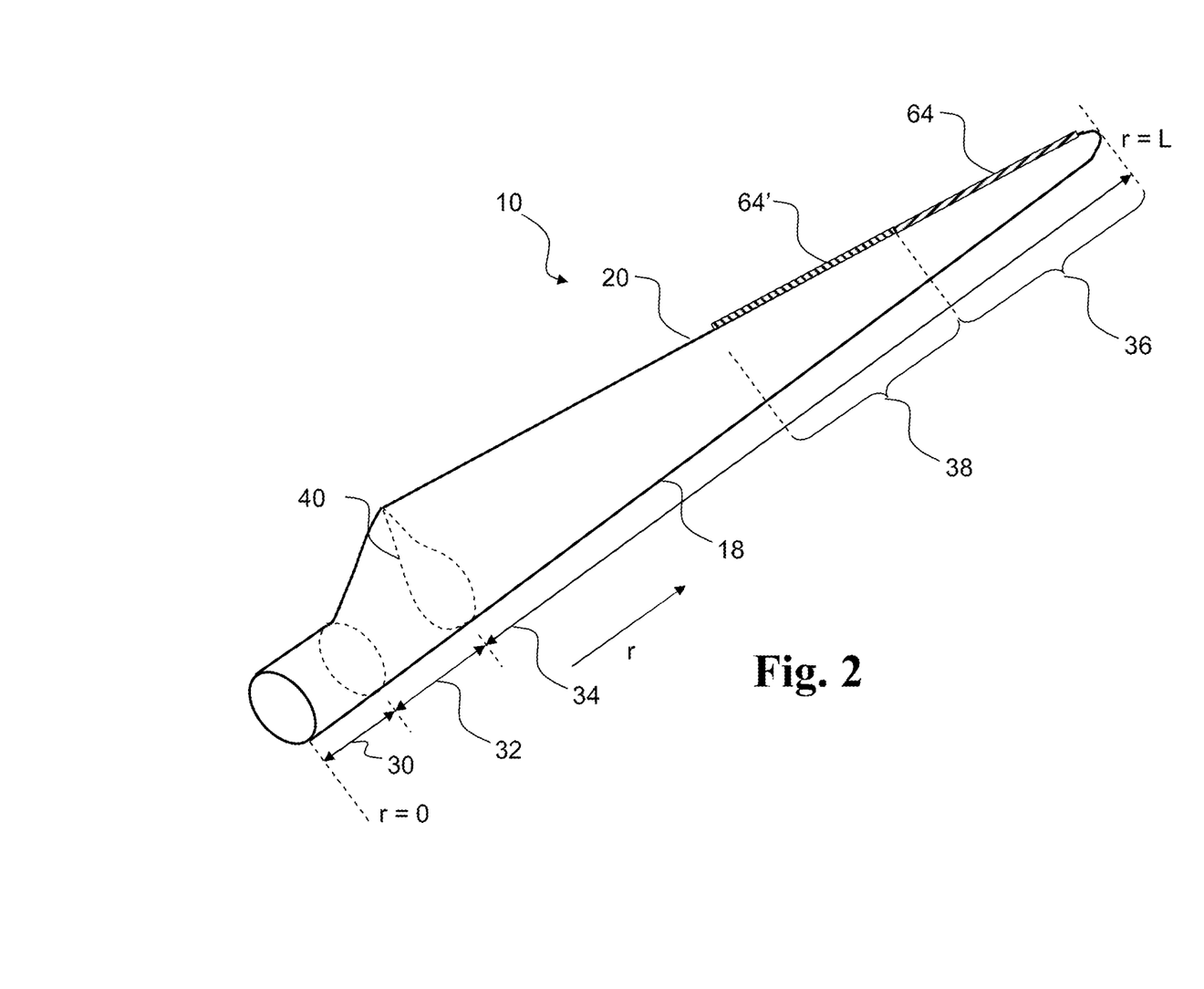
FIG. 2 schematically illustrates a wind turbine blade according to the invention.

FIG. 2 shows a schematic view of an exemplary embodiment of a wind turbine blade 10 according to the invention. The wind turbine blade 10 extends from the root end to the tip end in a longitudinal direction as shown by arrow r parallel to the longitudinal axis or pitch axis. The wind turbine blade 10 comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord in the airfoil region decreases with increasing distance r from the hub. A shoulder 40 of the blade 10 is defined as the position, where the blade 10 has its largest chord length. The shoulder 40 is typically provided at the boundary between the transition region 32 and the airfoil region 34.

The wind turbine blade comprises a first longitudinal section 36 having a cross section with a first primary flow modulating device 64 and a first secondary flow modulating device (not shown) for modulating noise spectra. The first primary flow modulating device and the first secondary flow modulating device are spaced perpendicularly to the longitudinal direction illustrated by the arrow r, i.e. spaced in a direction perpendicular to the longitudinal direction. Optionally, the wind turbine blade may as illustrated in FIG. 2 comprise a second longitudinal section 38 having a cross section with a second primary flow modulating device 64' and a second secondary flow modulating device (not shown) for modulating noise spectra. The second primary flow modulating device and the second secondary flow modulating device are if present spaced perpendicularly to the longitudinal direction illustrated by the arrow r. The flow modulating devices are mounted near or at the trailing edge of the wind turbine blade and may form a part of the trailing edge.

Figure 3:
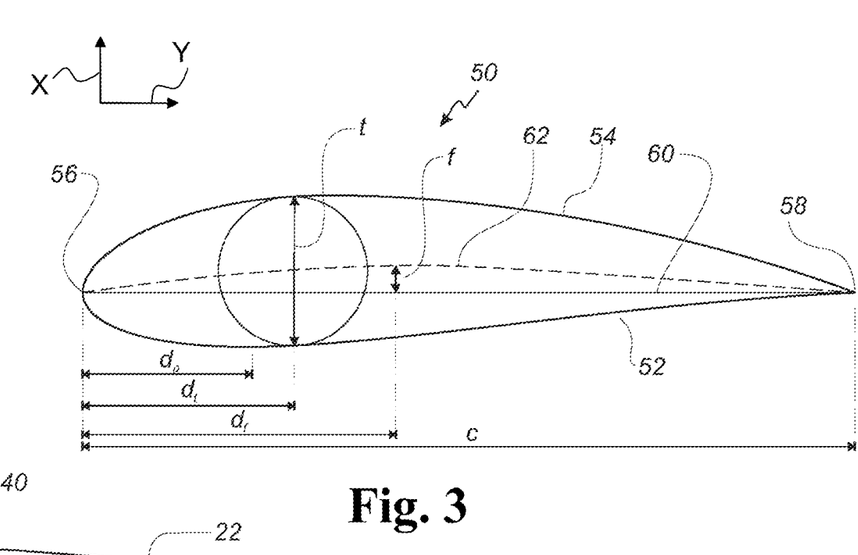
FIG. 3 shows a cross section of a wind turbine blade.
Figure 4:
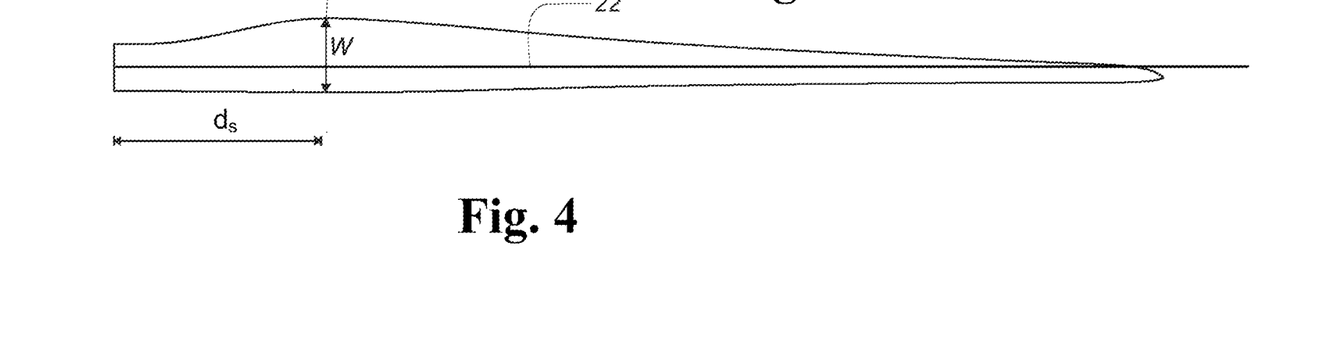
FIG. 4 shows a wind turbine blade.

FIGS. 3 and 4 depict parameters, which may be used to explain the geometry of the wind turbine blade according to the invention.

FIG. 3 shows a schematic view of a cross section of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The camber line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber (or suction side camber) and lower camber (or pressure side camber), which are defined as the distances from the chord 60 and the suction side 54 and pressure side 52, respectively. Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c. Thus, a local relative blade thickness t/c is given as the ratio between the local maximum thickness t and the local chord length c. Further, the position $d_p$ of the maximum pressure side camber may be used as a design parameter, and of course also the position of the maximum suction side camber.

FIG. 4 shows other geometric parameters of the blade. The blade has a total blade length L. As shown in FIG. 3, the root end is located at position r=0, and the tip end located at r=L. The shoulder 40 of the blade is located at a position $r=d_s$, and has a shoulder width W, which equals the chord length at the shoulder 40.

Figure 5:
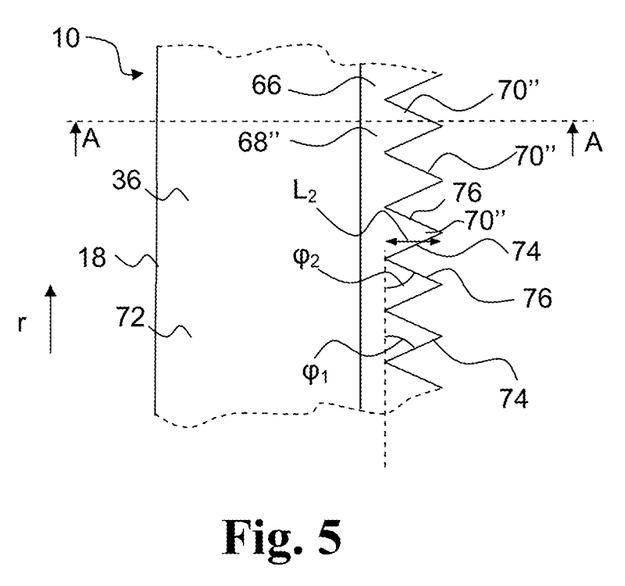
FIG. 5 shows a part of an exemplary wind turbine blade.

FIG. 5 shows a part of an exemplary wind turbine blade according to the invention. The wind turbine blade 10 comprises a first longitudinal section 36 comprising a first primary flow modulating device (not shown) and a first secondary flow modulating device 66. The first primary flow modulating device comprises a base (not shown) attached to the blade shell 72, and a plurality of primary protruding elements (not shown) distributed along the longitudinal axis at the trailing edge of the wind turbine blade. Further, the first secondary flow modulating device 66 comprises a base 68" attached to the blade shell 72, and a plurality of secondary protruding elements 70" distributed along the longitudinal axis at the trailing edge of the wind turbine blade. Primary protruding elements (not shown) form a first serrated trailing edge of the wind turbine blade (see FIG. 6 and FIG. 7). First edge parts 74 and second edge parts 76 of the secondary protruding elements 70" form a second serrated trailing edge of the wind turbine blade. First edge parts 74 form respective first angles $\phi_1$ with the longitudinal axis, and second edge parts 76 form respective second angles $\phi_2$ with the longitudinal axis. The length $L_2$ of secondary protruding elements may vary, e.g. $L_2$ may be in the range from 3 cm to about 20 cm. The first angle $\phi_1$ may be in the range from 0 to about 90°, e.g. about 45°. In one or more embodiments, the first angle $\phi_1$ is larger than 40°, e.g. in the range from 60° to 75°. The second angle $\phi_2$ may be in the range from 0 to about 90°, e.g. about 45°. In one or more embodiments, the second angle $\phi_2$ is larger than 40°, e.g. in the range from 60° to 75°.

For a respective flow modulating device, first angles $\phi_1$ of respective first edges of protruding elements may vary and/or second angles $\phi_2$ of respective second edges of protruding elements may vary. An edge part may be straight. In one or more embodiments, one or more edge parts of one or more protruding elements are curved.

Figure 6:
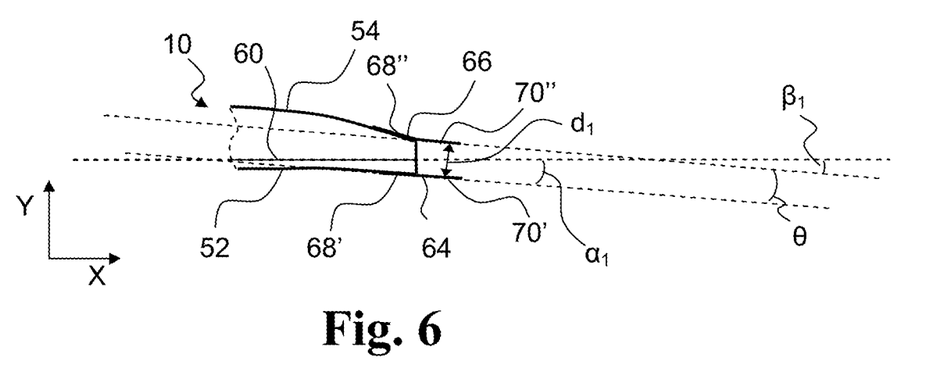
FIG. 6 shows a part of a cross section of the wind turbine blade in FIG. 5

FIG. 6 partly shows a part of an exemplary cross section of the wind turbine blade shown in FIG. 5, the cross section taken along line A-A. The first longitudinal section 36 of the wind turbine blade 10 comprises a first primary flow modulating device 64 with a base 68' and a primary protruding element 70', and a secondary flow modulating device 66 with a base 68" and a secondary protruding element 70". The base 68' is attached to the pressure side 52 of the wind turbine blade and the base 68" is attached to the suction side 54 of the wind turbine blade. The first primary flow modulating device 64 is arranged to modulate the pressure side boundary flow created during operation of the wind turbine. The first secondary flow modulating device 66 is arranged to modulate the suction side boundary flow created during operation of the wind turbine. The flow modulating devices 64, 66 are spaced perpendicular to the longitudinal direction. The primary protruding element 70' and the secondary protruding element 70" are substantially parallel, i.e. $\theta_1=0$, with a distance $d_1$ of about 2.5 mm, thus the first primary flow modulating device 64 and the first secondary flow modulating device 66 are spaced in the flapwise direction. In general, the distance between protruding elements of different flow modulating devices may be in the range from about 1 mm to about 5 cm. A protruding element of a flow modulating device may contact a protruding element of a different flow modulating device in one or more cross sections. The flow modulating devices 64, 66 or protruding elements thereof 70, 70" may be substantially parallel to the chord 60 or form an angle $\alpha_1$ and $\beta_1$, respectively, with the chord.

Figure 7:
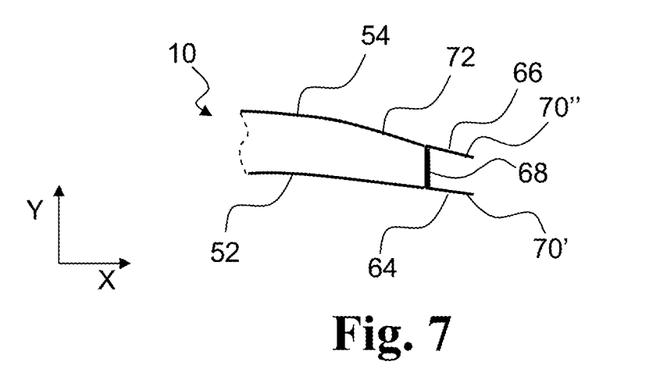
FIG. 7 shows a part of a cross section of an exemplary longitudinal section.

FIG. 7 partly shows a part of an exemplary cross section of the wind turbine blade shown in FIG. 5, the cross section taken along line A-A. The longitudinal section 36 comprises a first primary flow modulating device 64 and a secondary flow modulating device 66 with a common base 68 attached to the trailing edge of the blade shell of the wind turbine blade. The first primary flow modulating device 64 comprises a primary protruding element 70', and the secondary flow modulating device 66 with a secondary protruding element 70". The primary protruding element 70' and the secondary protruding element 70" are plane elements with an angle $\theta_1$ of about 5°. The smallest distance $d_{1,min}$ is about 2 mm.

Figure 8:
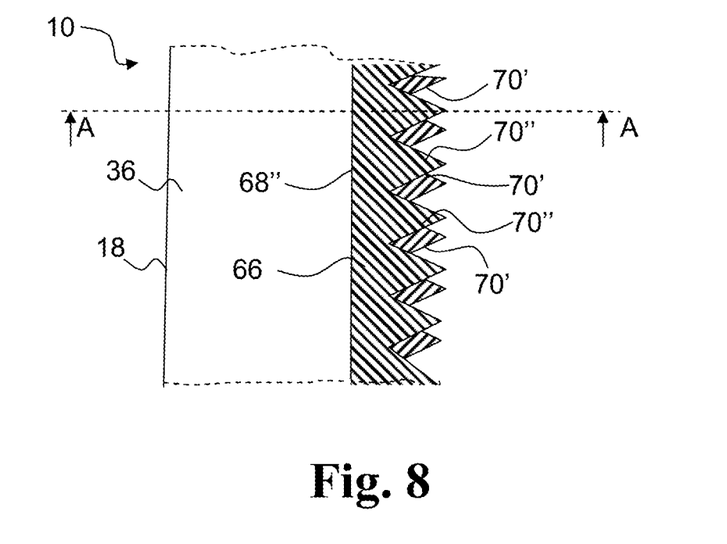
FIG. 8 shows a part of an exemplary wind turbine blade.

FIG. 8 shows a part of an exemplary wind turbine blade according to the invention. The wind turbine blade 10 comprises a first longitudinal section 36 comprising a first primary flow modulating device and a first secondary flow modulating device 66. The first primary flow modulating device comprises a base (not shown) attached to the pressure side of the wind turbine blade, and a plurality of primary protruding elements 70' distributed along the longitudinal axis at the trailing edge of the wind turbine blade. Further, the first secondary flow modulating device 66 comprises a base 68" attached to the suction side of the wind turbine blade, and a plurality of secondary protruding elements 70" distributed along the longitudinal axis at the trailing edge of the wind turbine blade. Primary protruding elements 70' form a first serrated trailing edge of the wind turbine blade (see FIG. 9). The secondary protruding elements 70" form a second serrated trailing edge of the wind turbine blade. The primary protruding elements 70' and the secondary protruding elements 70" are displaced along the longitudinal axis.

Figure 9:
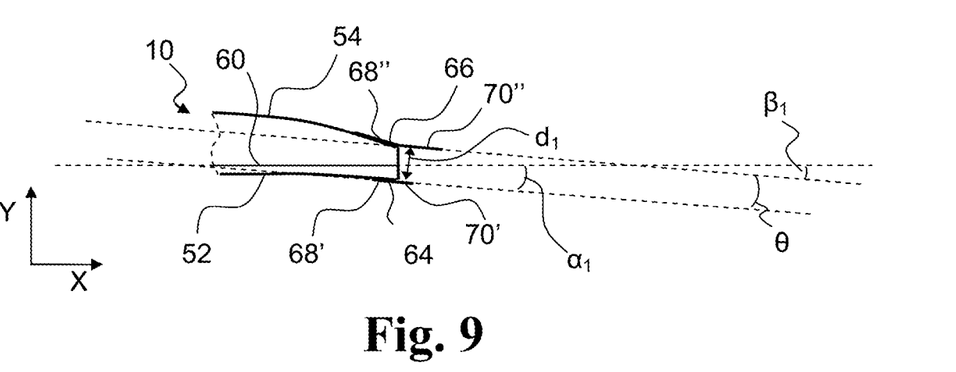
FIG. 9 shows a part of a cross section of the wind turbine blade in FIG. 8.

FIG. 9 partly shows a part of an exemplary cross section of the wind turbine blade shown in FIG. 8, the cross section taken along line A-A.

Figure 10:
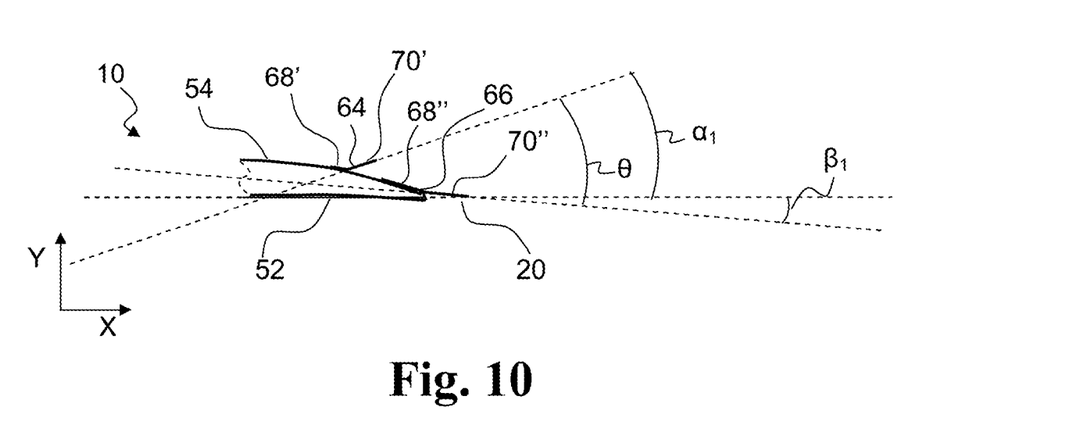
FIG. 10 shows a part of a cross section of an exemplary wind turbine blade.

FIG. 10 partly shows a part of an exemplary cross section of a wind turbine blade. The first primary flow modulating device 64 and the first secondary flow modulating device 66 are arranged on the suction side of the wind turbine blade and spaced in an edgewise direction. In one or more embodiments, the first primary flow modulating device 64 and the first secondary flow modulating device 66 are arranged on the pressure side of the wind turbine blade and spaced in an edgewise direction. Edge parts of primary protruding elements 70' form a first serrated edge, and edge parts of secondary protruding elements 70" form a second serrated edge at the trailing edge of the wind turbine blade.

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

LIST OF REFERENCE NUMERALS 2 wind turbine
4 tower
6 nacelle
8 hub
10 wind turbine blade
14 blade tip
16 blade root
18 leading edge
20 trailing edge
22 pitch axis
30 root region
32 transition region
34 airfoil region
36 first longitudinal section
38 second longitudinal section
40 shoulder, shoulder airfoil profile
52 pressure side
54 suction side
56 leading edge
58 trailing edge
60 chord
62 camber line/median line
64 first primary flow modulating device
66 first secondary flow modulating device
68, 68', 68" base
70' primary protruding element(s)
70" secondary protruding element(s)
72 blade shell
74 first edge part
76 second edge part
c chord length
$d_t$ position of maximum thickness
$d_f$ position of maximum camber
$d_p$ position of maximum pressure side camber
$d_s$ shoulder distance
f camber
L blade length
P power output
W shoulder chord length
X first axis
Y second axis
r longitudinal direction, radial distance from blade root
t thickness
$v_w$ wind speed
α primary angle between primary flow modulating device and chord
β secondary angle between secondary flow modulating device and chord
θ angle between primary and secondary flow modulating device
$\phi_1$ first angle between first edge part and longitudinal axis
$\phi_2$ second angle between second edge part and longitudinal axis
Δy prebend

The invention claimed is:

1. A wind turbine blade for a wind turbine rotor having a substantially horizontal rotor shaft, the rotor comprising a hub, from which the wind turbine blade extends substantially in a radial direction when mounted to the hub, the wind turbine blade extending in a longitudinal direction parallel to a longitudinal axis and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the wind turbine blade further comprising at least a first longitudinal section having a cross section with a first plurality of projecting elements provided at the trailing edge on said pressure side, said first plurality of projecting elements forming a first serrated trailing edge of the wind turbine blade, and a second plurality of projecting elements provided at the trailing edge on said suction side, said second plurality of projecting elements forming a second serrated trailing edge of the wind turbine blade, said first plurality of projecting elements spaced from said second plurality of projecting elements in a flapwise direction, wherein said first plurality of projecting elements are arranged to perform a first modulation operation of a boundary layer flow of the pressure side of the blade, wherein said second plurality of projecting elements are arranged to perform a second modulation operation of a boundary layer flow of the suction side of the blade, said first and second modulation operations operable to reduce operational noise of the wind turbine blade, and wherein said first plurality of projecting elements and said second plurality of projecting elements are arranged such that said first modulation operation is different to said second modulation operation.

2. The wind turbine blade as claimed in claim 1, wherein a shape of said first plurality of projecting elements is different to a shape of said second plurality of projecting elements, such that said first modulation operation is different to said second modulation operation.

3. The wind turbine blade according to claim 1, wherein at least one of said first plurality of projecting elements and said second plurality of projecting elements comprises a base and at least one protruding element and is arranged as a panel, strip or tape extending along the first longitudinal section.

4. The wind turbine blade according to claim 1, wherein said first plurality of projecting elements forms a first serrated edge having a first spatial frequency, and said second plurality of projecting elements forms a second serrated edge having a second spatial frequency, wherein said first spatial frequency is different to said second spatial frequency.

5. The wind turbine blade according to claim 1, wherein said first plurality of projecting elements forms a first serrated edge having a first inter-serration vertex angle, and said second plurality of projecting elements forms a second serrated edge having a second inter-serration vertex angle, wherein said first inter-serration vertex angle is different to said second inter-serration vertex angle.

6. The wind turbine blade according to claim 1, wherein said first plurality of projecting elements forms a first serrated edge having a first serration length, and said second plurality of projecting elements forms a second serrated edge having a second serration length, wherein said first serration length is different to said second serration length.

7. The wind turbine blade according to claim 1, wherein said first plurality of projecting elements forms a first serrated edge, and said second plurality of projecting elements forms a second serrated edge, wherein said first serrated edge is offset in the longitudinal direction from said second serrated edge.

8. The wind turbine blade according to claim 1, wherein said first plurality of projecting elements forms a first serrated edge, and said second plurality of projecting elements forms a second serrated edge, wherein said first serrated edge is offset in an edgewise direction from said second serrated edge.

9. The wind turbine blade according to claim 1, wherein said profiled contour comprises a blunt trailing edge, and wherein said first plurality of projecting elements are provided on a pressure side of said blunt trailing edge, and wherein said second plurality of projecting elements are provided on a suction side of said blunt trailing edge.

10. The wind turbine blade according to claim 1, wherein at least one of said first plurality of projecting elements and said second plurality of projecting elements are formed from a flexible material, said at least one first or second plurality operable to flex with the passage of wind over said at least one first or second plurality.

11. The wind turbine blade according to claim 1, wherein at least one of said first plurality of projecting elements and said second plurality of projecting elements are formed from a relatively stiff material, said at least one first or second plurality operable to resist flexing with the passage of wind over said at least one first or second plurality.

12. The wind turbine blade according to claim 1, wherein a first of said first plurality of projecting elements and said second plurality of projecting elements are formed from a relatively stiff material, and a second of said first plurality of projecting elements and said second plurality of projecting elements are formed from a relatively flexible material.

13. The wind turbine blade according to claim 1, wherein the first longitudinal section at least partly extends in the longitudinal direction at a distance from the root end in the range from 0.3L to L, where L is the length of the wind turbine blade.

14. A wind turbine comprising at least one wind turbine blade as claimed in claim 1.

15. A method of retrofitting a wind turbine blade extending in a longitudinal direction and having a tip end and a root end, the wind turbine blade further comprising a profiled contour including a pressure side and a suction side, as well as a leading edge and a trailing edge with a chord having a chord length extending there between, the profiled contour, when being impacted by an incident airflow, generating a lift, the method comprising:

mounting a flow modulating system on the wind turbine blade, such that the wind turbine blade comprises at least one longitudinal section having a cross section and a plurality of flow modulating devices, wherein the at least one longitudinal section comprises a first longitudinal section having a cross section with a first plurality of projecting elements provided at the trailing edge on said pressure side, said first plurality of projecting elements forming a first serrated trailing edge of the wind turbine blade, and a second plurality of projecting elements provided at the trailing edge on said suction side, said second plurality of projecting elements forming a second serrated trailing edge of the wind turbine blade, said first plurality of projecting elements spaced from said second plurality of projecting elements in a flapwise direction, wherein said first plurality of projecting elements are arranged to perform a first modulation operation of a boundary layer flow of the pressure side of the blade, wherein said second plurality of projecting elements are arranged to perform a second modulation operation of a boundary layer flow of the suction side of the blade, and wherein the shape of said first plurality of projecting elements is different to the shape of said second plurality of projecting elements, such that said first modulation operation is different to said second modulation operation.

* * * * *